US009805255B2

United States Patent
Yang et al.

(10) Patent No.: US 9,805,255 B2
(45) Date of Patent: Oct. 31, 2017

(54) TEMPORAL FUSION OF MULTIMODAL DATA FROM MULTIPLE DATA ACQUISITION SYSTEMS TO AUTOMATICALLY RECOGNIZE AND CLASSIFY AN ACTION

(71) Applicant: Conduent Business Services, LLC, Dallas, TX (US)

(72) Inventors: Xitong Yang, Rochester, NY (US); Edgar A. Bernal, Webster, NY (US); Sriganesh Madhvanath, Pittsford, NY (US); Raja Bala, Pittsford, NY (US); Palghat S. Ramesh, Pittsford, NY (US); Qun Li, Webster, NY (US); Jayant Kumar, San Jose, CA (US)

(73) Assignee: Conduent Business Services, LLC, Dallas, TX (US)

(*) Notice: Subject to any disclaimer, the term of this patent is extended or adjusted under 35 U.S.C. 154(b) by 0 days.

(21) Appl. No.: 15/010,351

(22) Filed: Jan. 29, 2016

(65) Prior Publication Data
US 2017/0220854 A1 Aug. 3, 2017

(51) Int. Cl.
*G06K 9/62* (2006.01)
*G06K 9/00* (2006.01)
(Continued)

(52) U.S. Cl.
CPC ..... *G06K 9/00335* (2013.01); *G06K 9/00765* (2013.01); *G06K 9/46* (2013.01);
(Continued)

(58) Field of Classification Search
CPC .......... G06F 3/011–3/015; G06F 3/017; G06F 1/163; G06F 3/0304; G06T 2207/30196;
(Continued)

(56) References Cited

U.S. PATENT DOCUMENTS

2012/0323760 A1 12/2012 Lee et al.
2014/0100835 A1* 4/2014 Majumdar ........... G06Q 10/047
703/11
(Continued)

OTHER PUBLICATIONS

Zajdel et al., "Cassandra: audio-video sensor fusion for aggression detection", IEEE Int. Conf. on Advanced Video and Signal based Surveillance (AVSS), London (UK), 2007, pp. 1-6.*
(Continued)

*Primary Examiner* — Brian P Werner
(74) *Attorney, Agent, or Firm* — Fox Rothschild LLP

(57) ABSTRACT

A multimodal sensing system includes various devices that work together to automatically classify an action. A video camera captures a sequence of digital images. At least one other sensor device captures other sensed data (e.g., motion data). The system will extract video features from the digital images so that each extracted image feature is associated with a time period. It will extract other features from the other sensed data so that each extracted other feature is associated with a time period. The system will fuse a group of the extracted video features and a group of the extracted other features to create a fused feature representation for a time period. It will then analyze the fused feature representation to identify a class, access a data store of classes and actions to identify an action that is associated with the class, and save the identified action to a memory device.

35 Claims, 7 Drawing Sheets

(51) Int. Cl.
*G06K 9/46* (2006.01)
*G06K 9/66* (2006.01)

(52) U.S. Cl.
CPC ......... *G06K 9/6261* (2013.01); *G06K 9/6267* (2013.01); *G06K 9/66* (2013.01)

(58) Field of Classification Search
CPC ....... G06K 9/00335–9/00355; G06K 9/00765; G06K 9/6288–2009/6295
See application file for complete search history.

(56) References Cited

U.S. PATENT DOCUMENTS

| | | |
|---|---|---|
| 2015/0269668 A1 | 9/2015 | Gil et al. |
| 2017/0061326 A1* | 3/2017 | Talathi ................. G06N 99/005 |

OTHER PUBLICATIONS

Eyben et al., Audiovisual Classification of Vocal Outbursts in Human Conversation Using Long-Short-Term Memory Networks, IEEE publication, 2011, pp. 5844-5847.*

Srivastava et al., "Learning Representations for Multimodal Data with Deep Belief Nets", presented at the ICML Representation Learning Workshop, Edinburgh, Scotland, UK, 2012.

Srivastava et al., "Multimodal Leaning with Deep Boltzmann Machines", printed from internet Jan. 11, 2016.

Krizhevsky et al., "ImageNet Classification with Deep Convolutional Neural Networks", printed from internet Jan. 11, 2016.

Snoek et al., "Early versus Late Fusion in Semantic Video Analysis", published in Proceedings of the 13th annual ACM International Conference on Multimedia, pp. 399-402, printed from internet Jan. 11, 2016.

Kumar et al., "On-the-Fly Hand Detection Training with Application in Egocentric Action Recognition", printed from internet Jan. 11, 2016.

Ngiam et al., "Multimodal Deep Learning", Appearing in Proceedings of the 28th International Conference on Machine Learning, Bellevue, WA, USA, 2011.

Suk et al., "Hierarchical feature representation and multimodal fusion with deep learning for AD/MCI diagnosis", NeuroImage 101 (2014) 569-582.

Sohn et al., "Improved Multimodal Deep Learning with Variation of Information", printed from internet Jan. 11, 2016.

Eyben et al., "Audiovisual Classification of Vocal Outbursts in Human Conversation Using Long-Short-Term Memory Networks", 2011, pp. 5844-5847.

* cited by examiner

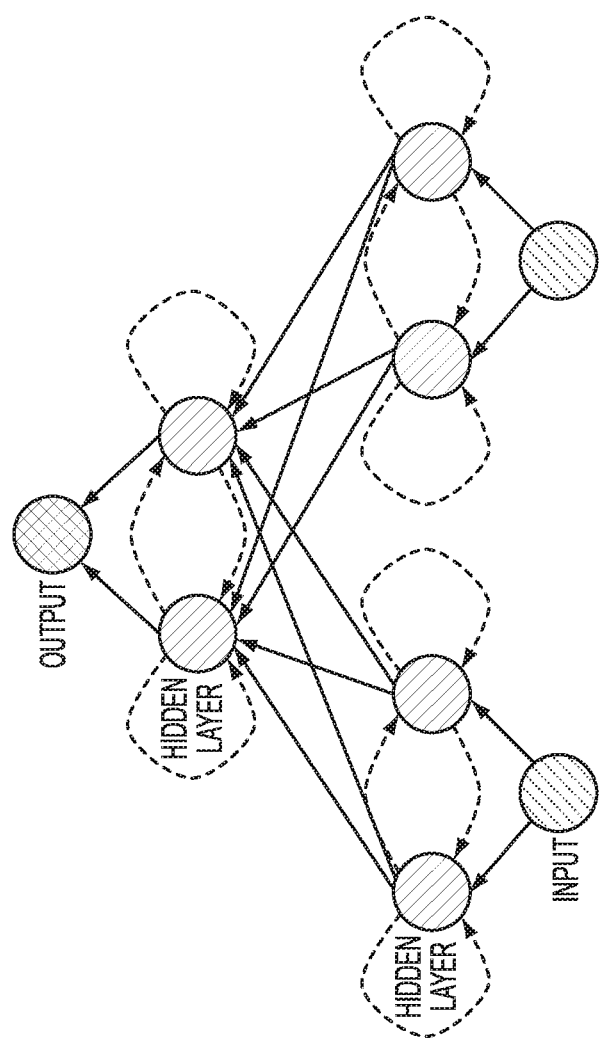

TEMPORAL FUSION OF MULTIMODAL DATA FROM MULTIPLE DATA ACQUISITION SYSTEMS TO AUTOMATICALLY RECOGNIZE AND CLASSIFY AN ACTION

BACKGROUND

Automated recognition of activity is a challenging problem with a wide range of applications. For example, video surveillance cameras may be used to monitor an environment where an activity is taking place. Wearable technologies such as body cameras, smart watches and camera-equipped eyewear make it possible to capture human activities from an egocentric or first-person perspective. Progress in wearable devices has resulted in the development of on-body sensors that are capable of collecting a variety of data descriptive of the motion parameters of the user. For instance, various smartwatches are equipped with an accelerometer, a gyroscope and/or a compass.

Joint processing of multimodal data acquired by simultaneous use of two or more different sensors can lead to a decrease in uncertainty about the acquired data and automated decision processes (e.g., object and activity classification and recognition, anomaly detection, etc.) based thereon, particularly when compared with scenarios where only one data modality is available. The synergistic combination of multiple types of data is termed multimodal data fusion, and a variety of approaches including early (e.g., at the feature-level) and late (e.g., at the decision-level) fusion schemes have been proposed. However, existing fusion schemes are still often not accurate or as useful as they could be in aiding decisions and in classifying human activity. This is particularly an issue in the healthcare field, where it is important that human actions be properly classified, and that recommendations be accurate.

This document describes devices and methods that are intended to address issues discussed above and/or other issues.

SUMMARY

A multimodal sensing system uses various sensing devices that work together to automatically classify an action. The system includes a video camera that captures a sequence of digital images, and at least one sensor device that captures other sensed data. Optionally, one or more of the other sensor devices are wearable, and they may include a microphone, a motion sensor, a positional sensor, and/or a temperature sensor. The system includes a processing device and programming instructions that cause the processing device to receive the sequence of digital images from the video camera so that each of the digital images is associated with a first time stamp. The processing device will receive the other sensed data from the at least one sensor device so that each item of other sensed data is associated with a second time stamp. The system will extract video features from short sequences of digital images (video clips) so that each extracted video feature has a first time stamp that is associated with a time period. The system will also extract other features from the other sensed data so that each extracted other feature has a second time stamp that is associated with the time period. The system will then fuse a group of the extracted video features corresponding to a time period and a group of the extracted other features corresponding to the time period to create a fused feature representation, analyze the fused feature representation to identify the action class that best captures the real-world action jointly described by the extracted video features and the extracted other features, and save the identified action to a computer readable memory device.

In some embodiments, when fusing the group of extracted video features, the system may use a multi-layer long-short-term memory network to create the fused feature representation. The multi-layer long-short-term memory network may include a first set of layers and a second set of layers. Each layer in the first set may be configured to independently operate on a single data modality, and the first set of layers may be configured to generate a set of per-modality features. The second set of layers may be configured to receive the per-modality features from the first set of layers and generate the fused feature representation as a set of fused features across data modalities.

Optionally, prior to fusing the extracted features, the system may temporally aggregate the extracted video features and the extracted other features across multiple video clips. After the temporal aggregation and prior to the fusing, the system may model temporal characteristics of the extracted video features and model temporal characteristics of the extracted other features. Optionally, when creating the fused feature representation the system may build a joint temporal model that jointly models temporal characteristics of the extracted video features and modeling temporal characteristics of the extracted other features.

Optionally, when analyzing the fused feature representation to identify a class that applies to the extracted video features taken together with the extracted motion features, the system may: (i) identify a set of candidate classifications that may apply to both the extracted video features and the extracted other features; (ii) identify a previously-identified class that is associated with an earlier fused feature representation that was created for an immediately-preceding time period; (iii) access the data store to determine which of the candidate classifications is a step that can follow the previously-identified class in a sequence of known actions; and (iv) select the determined candidate classification as the identified class.

Optionally, when the system fuses the extracted video features and the extracted other features to create a fused feature representation, the system may use a long-short-term memory network having a first hidden layer and a second hidden layer so that: (i) the first hidden layer independently identifies temporal trends in the extracted video features and the extracted motion features; and (ii) the second hidden layer uses the identified temporal trends to identify temporal correlations across modalities and performs the fusion.

Optionally, when extracting the video features and other features, the system may use one or more deep networks to learn a set of video features and other features to extract. The deep network(s) may include, for example, one or more of the following: a neural network, a convolutional neural network, an autoencoder, a Boltzmann machine, a long-short-term memory network, a convolutional neural network cascaded with a long-short-term memory network, an end-to-end deep neural network or a belief network. When extracting the video features and the other features, the system may extract features corresponding to those of the learned set.

Optionally, the video camera and/or other sensor device(s) may include a transmitter that it uses to transmit the video or other data to the processing components of the system.

Optionally, the system may also output the identified action via a user interface of an electronic device, access the data store to identify a subsequent action step that corresponds to the action (wherein the subsequent action step comprises a step in sequence of known actions), and output the subsequent action step via a user interface of a computing device.

DETAILED DESCRIPTION

Figure 1:
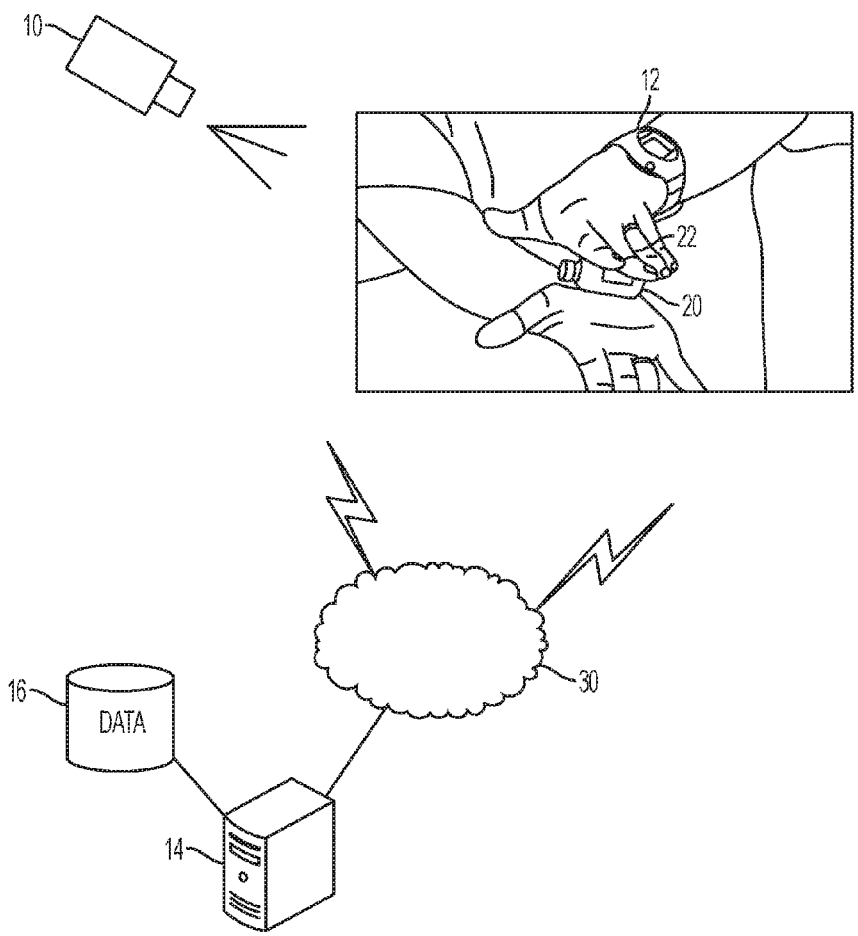
FIG. 1 depicts various components of a multimodal action classification.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

In this document, the term "computing device" refers to an electronic device having a processor and a non-transitory, computer-readable medium (i.e., memory). The memory may contain programming instructions in the form of a software application that, when executed by the processor, causes the device to perform one or more processing operations according to the programming instructions. A computing device also may include additional components such as a display device and/or audio output that serves as a user interface, as well as a camera or other video capturing device. A computing device also may include one or more communication hardware components such as a transmitter and/or receiver that will enable the device to send and/or receive signals to and/or from other devices, whether via a communications network or via near-field or short-range communication protocols. Examples of computing devices include servers, desktop computers, laptop computers, smartphones, tablet computing devices, electronic readers, personal computers, processor-equipped cameras, certain wearable electronic devices such as fitness tracking devices and motion tracking devices, and the like.

A "video capturing device" or "video camera" refers to any device having one or more image sensors capable of optically viewing an object and converting an interpretation of that object into electronic data that includes multiple image frames sequentially captured over a period of time. One such example of an imaging device is a digital camera. A video camera may be a stand-alone device, or it may be a component of an electronic device such as a smartphone, a wearable device such as electronic eyewear or a smart watch, or a robotic device such as a robotic medical probe or an aerial drone.

A "wearable electronic device" is a device that can be worn by a human and that has one or more electronic hardware components that are capable of sensing data about the human and/or the human's environment. Example sensors include motion sensors such as accelerometers, gyroscopes and/or compasses, as well as image sensors such as video cameras. A wearable electronic device will also include a data transmitter that can transmit data to one or more other electronic devices using a communication protocol such as that of a wireless data network, Wi-Fi, or short range communication or near field communication (NFC) protocols such as Bluetooth, Bluetooth Low Energy and radio frequency identification (RFID). Examples of wearable electronic devices include smart watches, fitness bands, electronic eyewear and the like.

FIG. 1 illustrates various components of a multimodal action classification system. The system may interpret activity in the physical world. The interpretation may take different forms, and the activity observed may be that of a human, animal or inanimate object such as a vehicle. For the purposes of illustration we consider the task of recognizing human actions from among a given set of actions. For example, the system may be used to automatically recognize, classify, and optionally guide or assess the quality of human actions based on data that the system collects about the action from multiple data acquisition or collection devices.

As an example, FIG. 1 illustrates a system being used to capture data about a medical procedure, and in this specific example the administration of an insulin injection to a human. The system includes a video capture device 10 and a wearable electronic device 12. In this example a human 22 is wearing the wearable device 12 on a portion of his/her body that is performing an action. (In particular, FIG. 1 shows a human wearing a motion sensor 12 on his wrist and preparing to administer an insulin injection using medical equipment 20 such as an insulin vial and syringe.) The video capture device 10 of this example is positioned separate from the human and pointed toward the human to capture the human's actions. Alternate embodiments may use an egocentric video capture device that is worn by the human such as electronic eyewear or a body camera. The video capture device 10 and wearable electronic device 12 may each include or be electrically connected to transmitters that are used to transfer the data that they capture to a computing device 14 such as a remote server or other data processing device. The data transfer may occur via one or more data networks 30 such as the internet, a Wi-Fi network, or one or more local communication connections such as an NFC connection. A computing device 14 such as a server will analyze the transferred data to extract features and identify actions embodied in the data. The computing device may store the transferred data in a data storage device 16, so that the computing device 14 can use previously stored data to help it analyze future data and recognize actions that are embodied in the future data.

Fusion of multimodal data to reduce uncertainty in data-driven decision-making and inference processes has been done in the past. Once data is acquired, it is common practice to extract features from the data, or equivalently, to map the data onto a feature space or to transform the data into representative features thereof. In the simplest implementation the feature space may be identical to the data space, that is, the transformation is the identity function and the features are equivalent to the incoming data. More generally, features are extracted from the incoming data in order to discard information that may be noisy or irrelevant in the data, and to achieve more concise or compact representation of the original data.

In some embodiments, the choice of features may be determined in advance. These features, often referred to as hand-engineered features, may be predefined or customized by a user, or retrieved from a memory. Hand-engineered features do not necessarily adapt to the nature of the data or the decision task. Examples of hand-engineered features for digital one-dimensional signals include Fast Fourier Transform (FFT), Discrete Cosine (DCT) or Discrete Wavelet Transform (DWT) coefficients, or coefficients resulting from the application of dimensionality reduction techniques like Principal Component Analysis (PCA). Examples of hand-engineered features for still images include 2-dimensional FFT, DCT or DWT coefficients, coefficients resulting from the application of dimensionality reduction techniques such as PCA, texture descriptors, scale-invariant features, points of interest, color histograms, histograms of gradients (HOG), among others. Examples of hand-engineered features that can be extracted from digital video signals include 3D HOG, dense trajectories, histograms of motion, optical flow vector fields, as well as temporal sequences of features that can be extracted from still images.

While the system may use hand-engineered features, hand-engineered features can have limitations in certain situations. The choice of features will largely affect the performance of the system, so domain expertise may be required for the user to make the right feature choice. Also, a degree of fine-tuning of the parameters of the features is often required, which can be time-consuming, and also requires domain expertise. Lastly, hand-engineered features do not necessarily generalize well, so the fact that they work well for a given task doesn't necessarily mean that they will perform well for another task, even when the same set of data modalities is involved in the different tasks.

Thus, in some embodiments the system may also, or alternatively, automatically learn an optimal feature representation given a set of data in support of a given automated decision task. The system may learn a feature representation by means of one or more deep networks such as neural networks, convolutional neural networks, autoencoders, Boltzmann machines, long-short-term memory networks, convolutional neural networks cascaded with long-short-term memory networks, end-to-end deep neural networks and belief networks. The deep network(s) may be part of the system (e.g., embodied in the computing device 14 of FIG. 1), or it may be a separate network that is in communication with the system. A single deep network may be used, or multiple deep networks may be used. In some embodiments, different deep networks or combinations of deep networks may be used for data from different data modalities. Deep networks provide hidden and output variables associated with nodes that are connected in various manners, usually across multiple layers, and with connections between nodes usually being weighted by a real number. The values of the variables associated with a particular node may be computed as a (non-linear) function of weights and variables associated with nodes that have incoming connections to the node in question. In the context of feature learning, the hidden variables in the neural network can be viewed as features.

An optimal feature representation may be obtained by finding the set of weights that minimize a loss function between an output elicited by a given input and the label of the input.

Once extracted, it is usually the features, rather than the original data, that are further processed in order to perform decisions or inferences based on the incoming data. In the case of multimodal data fusion, the combination of the multiple modes is usually performed after features from each of the modalities are extracted. Two types of prior art fusion approaches include: (i) early fusion processes; and (ii) late fusion processes. In early fusion processes, features are extracted from each data modality and a fused representation is achieved by combining or concatenating the extracted features. In traditional inference tasks, feature concatenation is usually followed by classifier training. In the early fusion approach, fusion takes place before any learning does. In late fusion schemes, learning takes place independently for each data modality, and fusion occurs at the inference score level. This is done, for example, by computing a majority vote or weighted average of the decisions made independently by each classifier based on each data modality. Both of these fusion schemes fail to capture higher-level dependencies and correlations across the different data modalities. In the system described in this disclosure, a multi-modal data fusion process exploits temporal dependencies across multiple modalities of inherently temporal data, that is, data that is acquired continuously (or semi-continuously over time) and in a sequential manner. It may be considered to be a type of early fusion in that the fusion occurs prior to assigning class labels. Unlike known early fusion processes, however, the processes described in this document explicitly capture temporal sequence behavior and correlations within and across modalities. As will become apparent later, another advantage of the approach described in this document relative to prior art techniques is that it automatically extracts the features from the multiple modalities that are best (or at least well) suited to exploit the correlations across modalities, in support of decision-making processes. This is in contrast with existing techniques where the nature of the extracted features is determined once the type of feature to use is selected. The approach described in this document may boost action classification performance relative to the prior art fusion approaches. Types of data captured may include video, audio and motion sensor data, among other types of data.

The system will automatically recognize an action using various modules, each of which is embodied in a combination of data collection or processing hardware, and programming instructions that process the collected data. The modules may include: (1) one or more data acquisition modules which acquire the video and motion data; (2) a video data feature extraction module which extracts features from the video stream; (3) a motion data feature extraction module which extracts features from the motion data stream; (4) a temporal fusion module which fuses the extracted features from both modalities; and (5) an action classification module which determines the type of action to which the incoming data corresponds. The system may include other types of data extraction modules in addition to, or as an alternative to, the video and motion data extraction modules. These can include audio, infrared, multispectral or hyperspectral imagery and video and ambient or object temperature. Alternatively or additionally, vital signs such as body temperature, pulse rate, respiration rate and blood pressure can be acquired and processed.

Figure 2:
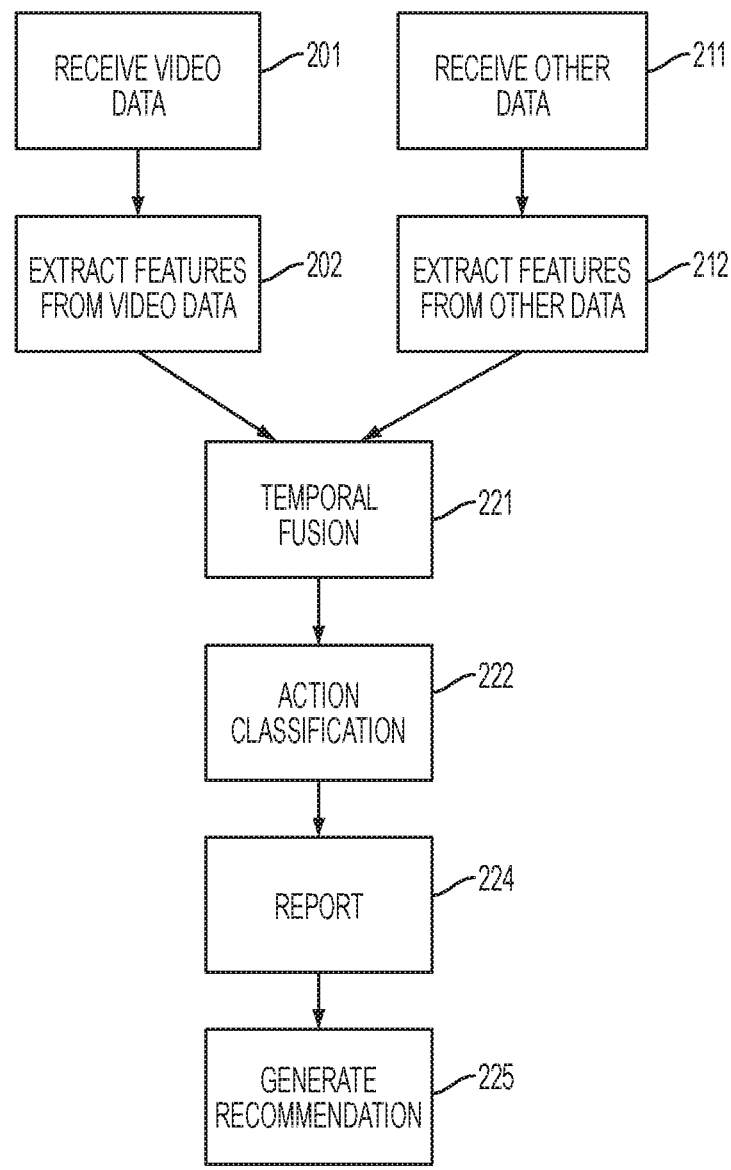
FIG. 2 is a flowchart that provides a high-level summary of a classification process.

FIG. 2 is a flowchart that provides a high-level overview of a method by which a multi-modal system may automatically recognize an action. The system will receive video data in the form of a sequence of digital images from a video camera 201. The system may receive the video data directly from the video camera as the camera collects the data, or indirectly via a communication network or after retrieving the data from a data storage facility. The video camera or remote computing device will assign an image time stamp as metadata to each of the digital images frames in the video sequence. The system will extract video features from short sequences of digital images (video clips) 202 so that each extracted video feature is associated with a time period (which may be a single point in time or a time span) corresponding to the time stamp(s) associated with the frame(s) from which the feature is extracted. In general, each video clip may be of a defined length (e.g., a maximum length such as 100 frames long, or a range of acceptable lengths), and may overlap the previous clip by a defined number of frames (e.g., 50 frames, or a threshold of no more than 50 frames).

The system will also receive other, optionally non-video, data from one or more other sensor devices 211. The sensor device may be a wearable sensor (e.g., a wristwatch or wrist or ankle bracelet) that collects motion data (e.g., pitch, yaw, acceleration, velocity or other motion-related data using motion-sensing hardware such a gyroscope and/or accelerometer), positional data (e.g., an orientation sensor such as a compass or a positional sensor such as a global positioning system sensor), audio data (e.g., detected speech using a microphone), biological data (such as skin temperature, heart rate or breathing rate sensor), or another set of video data using another camera. Like the image time stamps in the video data, the other sensor or remote computing device may assign a time stamp to each element of the other sensed data. Also like the video data, the system may receive the other sensed data directly from a non-video sensing device as the device collects the data, or indirectly via a communication network or after retrieving the data from a data storage facility. The system will extract other features from the other sensor data 212 so that each extracted feature is associated with a time period (single point or time span) corresponding to the time stamp(s) associated with the motion data from which the feature is extracted. In one embodiment, the extracted features may be hand-engineered. In an alternative embodiment, deep learning networks can be used to extract previously learned optimal feature representations.

The system will then fuse 221 the extracted video features associated with a time period (which corresponds to at least one, but possibly many time spans, stamps or instants) and the extracted other data features that are associated with the same time period to create a fused feature representation for the time period. In one embodiment, the fusion may be performed with the aid of one or more multi-layer long-short-term memory (LSTM) networks operating on features corresponding to the time period. An LSTM is known in the art as a type of recurrent neural network comprising one or more processors and programming instructions configured to learn long-term dependencies between data. (See, for example, Hochreiter and Schmidhuber, "Long Short-Term Memory," *Neural Computation* 9(8): 1735-1780, 1997.) The LSTM may be part of the system (e.g., embodied in the computing device 14 of FIG. 1), or it may be a separate network that is in communication with the system. In one embodiment, a primary set of layers of the LSTM operates on each data modality independently, and reduces long- and short-term within-modality data correlation. The output of the initial set of layers of the LSTM is a set of per-modality features with reduced within-modality correlation. This output is fed to a set of secondary layers of the LSTM which operates on all modalities simultaneously, and which exploits long- and short-term cross-modality correlations. The output of the last layer of the LSTM is a set of cross-modality or fused features that can be used in support of automated decision-making processes.

In one embodiment, where the features used for the representation of each modality are hand-engineered, the system may learn the parameters of the LSTM by minimizing a loss function between the output produced by incoming features associated with data of a given class and the desired output which corresponds to the class label. To this end, a soft-max layer can be applied to the output of the last layer of the LSTM. In another embodiment, where the features used for the representation of each modality are learned with deep networks, the system may learn parameters of each deep network associated with a modality independently by minimizing a loss function between the output produced by incoming features associated with data of a given class and the desired output which corresponds to the class label. In this case, the system may perform its classification process via the use of a soft-max layer on top of the last layer of each deep network. Once each per-modality feature extraction branch is optimized, the features associated with each data modality can be fed to the LSTM, and the optimization of the parameters of the LSTM can proceed as in the embodiment described above.

In yet another embodiment, the system may jointly optimize parameters of all the per-modality feature extraction branches as well as the parameters of the LSTM. This can be achieved by minimizing a loss function between the output produced by incoming features associated with multiple modalities of data of a given class, and the desired output which corresponds to the class label. Note that we refer to the last embodiment as an end-to-end deep system, whose parameters can be optimized jointly in a single learning stage.

The processor will implement instructions to analyze the fused feature representation to perform a classification process 222 that includes identifying a class that applies to both the extracted video features and the extracted other data features, and also identifying an action that is associated with the class. In one embodiment, the system may perform the classification by accessing a data store of actions and classifications and associated parameters, and by identifying those actions and/or classification having parameters that correspond to the extracted features. Examples of this will be described below. In another embodiment, the system performs the classification by applying a previously trained statistical classifier which was trained to learn the correspondences between extracted features and actions. In some cases, the classifier will learn boundaries in the feature space that separate feature representations between classes. Examples of classifiers that can be used in this embodiment include support vector machines, decision trees, random forests, and nearest-neighbor algorithms. In one embodiment, the classification process includes a temporal analysis to ensure that the extracted video features and extracted other features correspond to the same time period.

In some cases, actions may take place predominantly in predefined sequences. For a specific example of a set of actions that happen in a sequence, see the description of an insulin self-injection procedure below. If the system identifies that multiple candidate classifications could apply to both the extracted video features and the extracted other features, it may use additional temporal data to make the decision of which candidate classification to apply. For example, the system may identify a previously-identified class that is associated with an earlier fused feature representation that was created for an earlier time period (such as the immediately-preceding time period), access the data store determine which of the candidate classifications is a step that can follow the previously-identified class in a sequence of known actions, and use this information to influence the identification of a class.

The system will report the classification 224 by saving the identified action to a computer readable memory device and/or causing a user interface of an electronic device to output a report of the classification.

Optionally, the system may use the identified action to generate a recommendation 225, such as by recommending that the user should take a next action in a sequence. The system may do this by accessing the data store to identify sequence of known actions (such as steps of a medical procedure), identifying a subsequent action that would occur after the identified sequence, and recommending the subsequent action step.

An example application of the process may consider an insulin self-injection (ISI) data set, with egocentric video from a camera positioned on electronic eyewear, along with wrist motion data from a wrist-worn motion sensor. The method may monitor a subject human as he/she goes through seven different steps (actions) of a medical procedure such as an ISI procedure. The ISI process includes the following actions: (1) hand sanitation; (2) insulin rolling; (3) pulling air into a syringe; (4) withdrawing insulin; (5) cleaning the injection site; (6) injecting insulin; and (7) disposing of the needle. These steps may be stored in a data storage facility as an action sequence, and the system may use the stored sequence to help it recognize each step in the process when analyzing the fused feature representation. For example, in one embodiment, if the system analyzes a fused feature representation using an action classifier and determines that the detected action could be either injecting the needle or pulling air into the syringe, the system may access previously stored data to determine whether the system already detected that the human performed the steps of the sequence that should occur before injecting the insulin. If so, then the system may conclude that the fused feature representation represents an insulin injection. If not, then the system may conclude that the fused feature representation represents pulling air into the syringe, which is an earlier step in the medical procedure's sequence. In another embodiment, the likelihood of the transition between classes is learned from the training process. In this embodiment, the decision about the class to which the incoming features belong can be a weighted combination of the output of the classifier and the expected class given previously observed classes. For instance, it may be known from training that once the hand sanitation class is identified, the two most likely scenarios for new incoming features are to remain in the hand sanitation class or to transition to the insulin rolling class. Since a classifier decision is almost never unambiguous, the additional information about possible transitions between classes can be used to reduce uncertainty.

In an example application, wearable image-capturing eyewear was used to capture streaming video at VGA resolution, namely 640×480 pixels, at a frame rate of 30 frames/sec. Motion data was acquired by a wrist-worn sensor that reported three degrees of linear acceleration (x, y, and z) and four degrees of rotational velocity from a gyroscope. Before any further processing was applied, each channel in the motion data was normalized independently: the mean was subtracted and the signal scaled by its standard deviation. Temporal median filtering for smoothing with a filter of length 5 was also applied. Lastly, the data was downsampled to 30 Hz to match the frame rate of the incoming video.

The video feature extraction module may determine concise representations of the input data that are amenable to a certain task, and in this system an action classification task. In one embodiment, this module can thus extract per-frame features such as scale-invariant features (SIFT), histogram of oriented gradients (HOG), and local binary patterns (LBP), among others. Features that perform representation of batches of frames such as 3D SIFT, HOG-3D, space-time interest points (STIP), and dense trajectories (DT) can also be used. Alternatively, deep features learned from deep architectures including convolutional neural networks (CNN), deep auto-encoders, deep Boltzmann machines, and recurrent neural networks (RNN) such as long-short-term memory networks (LSTM), among others, can also be used. Note that before features can be extracted from these deep architectures, they may be trained, either in a supervised or an unsupervised manner. Alternatively, pre-trained models can be used.

The system may extract features from the video sequence by concatenating two or more modules. For example, in one embodiment, one module will extract purely visual features from individual frames. This may be accomplished by any now or hereafter known methods, such as by using the features used by a system that performs image classification using a deep convolutional neural network that has been trained on a dataset of images so that the system recognizes objects and features within those images. Examples of such methods are disclosed in, for example, Krizhevsky et al, "ImageNet Classification with Deep Convolutional Neural Networks," published in Advances in Neural Information Processing Systems 25, pages 1097-1105, June 2015. The features may be n-dimensional vectors corresponding to the activation if the last hidden layers in the network. A second module may aggregate the identified features temporally across multiple frames within a video clip, using a form of LSTM that models temporal sequences (video clips) as multi-frame windows with a smaller frame-set-size (e.g., half the size of the window) temporal stride. Additional modules may be used as well.

Figure 3:
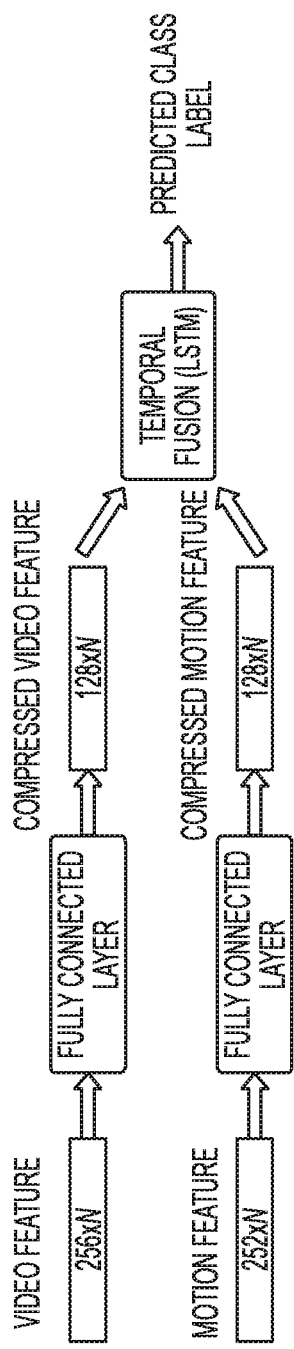
FIG. 3 illustrates an example of temporal fusion of data from two different sensing devices.

In the example, video feature extraction is accomplished via the use of a spatiotemporal network comprising the AlexNET CNN followed by an LSTM network. AlexNET was applied on a per-frame basis to extract 4096-dimensional feature vectors. The second module aggregates the visual features temporally across multiple frames using a long-short-term memory (LSTM) network. To this end, incoming videos are partitioned into 32-frame clips with a 16-frame temporal stride. Visual features are temporally aggregated across the frames in a clip with an LSTM network with 256 hidden states. The 256-dimensional vector corresponding to the hidden state of the LSTM at the end of each clip serves as the clip sequence representation. The weights of the LSTM were determined based on a training stage aimed at performing 7-class classification from videos in the ISI dataset. Thus, referring to FIG. 3, the video corresponding to an action to be recognized resulted in a sequence of 256-dimensional feature vectors 301a . . . 301n corresponding to overlapping, 32-frame sliding windows. It should be noted that the specific values used in this example are not the only embodiment of the invention, and other values may be applied in various embodiments.

Although other data dimensionalities and modalities can be acquired, a motion data feature extraction module may acquire two or more types of motion data, namely linear acceleration along the x, y, and z axes, and rotation and/or orientation in quaternions. Consequently, a 7-dimensional motion vector may be available for each time stamp. As before, hand-engineered features such as wavelet, fast Fourier transform (FFT) or DCT coefficients can be used. Alternatively, a deep network such as a CNN may be used to learn the optimal feature representation and to extract features from the motion data. The system may downsample the motion data streams so that the motion data streams have a frame rate that matches (i.e., equals or is substantially similar to) the frame rate of the video stream. The system may normalize the data in each motion channel independently by subtracting the mean of the data in each channel and scaling the data by the standard deviation. Temporal median filtering for smoothing may be applied. The system may enter the resulting streams into a one-dimensional (1D) CNN with two hidden layers. The system may concatenate the data before introducing it into the CNN, and the system may determine weights of the CNN via a supervised training procedure performed prior to the analysis of new data.

In the example discussed above, a deep 1D CNN with two hidden layers was used. Data corresponding to a 32-frame window was concatenated before being input to the CNN, which means that a 32×7 matrix was input to the CNN at each step. The coefficients of the CNN were shared across the different motion data channels, and determined based on a training stage aimed at performing 7-class classification from motion data in the ISI dataset. The last hidden layer of the CNN yielded a 12×3 output for each of the 32×1 inputs, for an aggregate of 12×3×7 output, or a 252-dimensional vector that is used as the feature representing the sensor data for each 32-frame window. Thus, as with the video input, the motion input corresponding to an action to be recognized resulted in a sequence of 252-dimensional feature vectors $302a \ldots 302n$ corresponding to overlapping, 32-frame sliding windows. Again, these values are only by way of example and are not intended to limit the scope of the invention.

As discussed above, prior art fusion approaches ignore temporal dependencies across modalities and across different points in time. For example, an early fusion approach would fuse at the feature-representation level. In other words, it would take the features extracted from each modality and concatenate them across modalities. On the other hand, late fusion schemes fuse at the decision level, such as by making inferences about the action or activity independently from each modality, and combining those inferences afterwards. For example, when the inference is in the form of a probability vector with number of entries equal to the number of actions, where the k-th vector entry corresponds to the estimated probability of the incoming data corresponding to the k-th activity, then there will be one such vector per each data modality. An aggregate decision across modalities can be made by combining the vectors corresponding to each modality, by using, for example, the weighted sum.

Figure 4A:
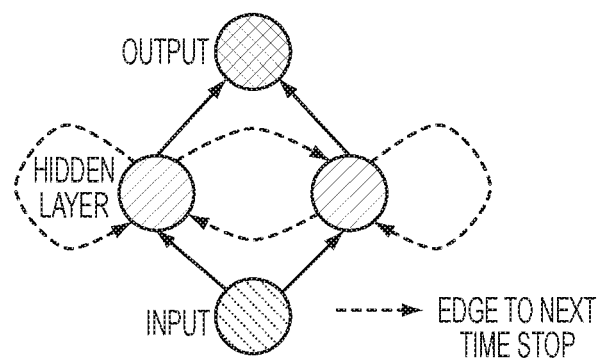
FIGS. 4 A-C provide visual examples of various long-short-term memory network architectures.
Figure 4B:
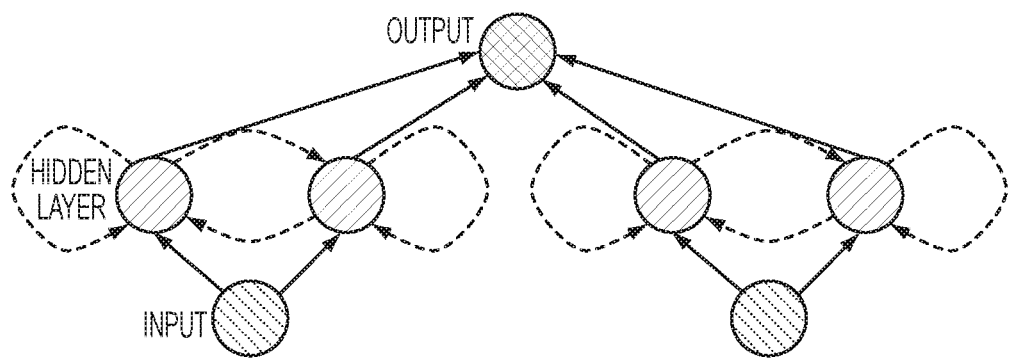

In contrast, in the embodiments discussed in this document, the features from the two modalities may be fused together using a network capable of modeling long-term temporal dynamics. An LSTM was used in the practiced embodiment, although the invention is not limited to this embodiment. The LSTM, which considers both long term and short term data, fuses both temporally adjacent (short term) data and non-temporally adjacent (long term) data so that the resulting data set captures a representation of the data on both a short-term and a long-term basis. An LSTM is a type of neural network which, unlike traditional feed-forward networks, can model temporal data trends via the use of recurrent connections. An LSTM comprises layers of memory blocks, with various degrees of connectivity among themselves. The number of memory blocks in the layers controls the degree of complexity of the temporal patterns that can be modelled: a larger number of blocks will enable support of higher complexity signals. The degree of connectivity between the blocks and the layers controls the nature of the learning. For example, the LSTM in FIG. 4A has one fully connected hidden layer which has two memory blocks. This LSTM would be capable of modelling the temporal behavior of the Input signal and produce an Output signal that is a function of the temporal behavior of the input signal. In contrast, the LSTM in FIG. 4B has one partially connected hidden layer with four memory blocks. This LSTM would be capable of independently modelling the temporal behavior of two Input signals, and produce an Output signal that is a function of the independent temporal behavior of the signals. The LSTM in FIG. 4C has one partially connected hidden layer with four memory blocks and one fully connected hidden layer with two memory blocks. The first layer of this LSTM would be capable of independently modelling the temporal behavior of two Input signals, while the second layer would be capable of jointly modelling the temporal behavior of the signals; consequently, the LSTM would be able to produce an Output signal that is a function of the joint temporal behavior of the signals. In one embodiment, the LSTM may have two hidden layers, one that is fully connected to each modality, and one that is fully connected as illustrated in FIG. 5.

As discussed above, in the example for each 32-frame sliding window, the video feature extraction module yields a 256-dimensional feature representation, while the motion data feature extraction module extracts a 252-dimensional vector. FIG. 5 illustrates how the fusion may occur across different time instants in a temporally unfolded view of the operation of the LSTM. In FIG. 5, N denotes the number of 32-frame windows in the video being processed with a stride of 16 frames. The first hidden layer in FIG. 5 has 128 units per modality, and it maps the input features to 128-dimensional activations. The second hidden layer has 128 units. The last layer of the LSTM will have as many units as there are possible classifications in the classification task. The first hidden layer will learn temporal trends on each modality independently. The second hidden layer will learn temporal correlations across modalities and effectively perform the temporal data fusion.

Figure 5:
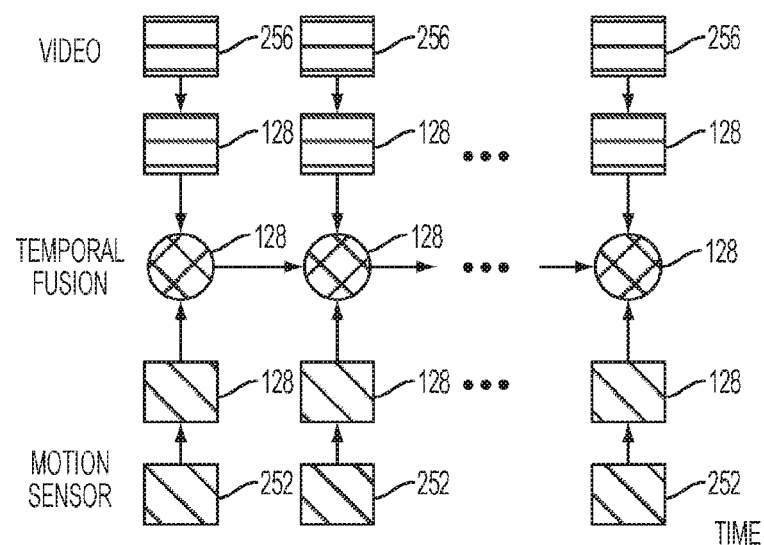
FIG. 5 illustrates an example of fusion of data that is simultaneously captured at a time or during a common time period.

The first stage of the fusion process depicted in FIG. 5 is used to reduce the dimensionality of each modality to a common dimensionality. In some implementations, temporal fusion may be achieved with multiple fully connected segments of a first hidden layer in an LSTM, the layer having one segment for each modality. The per-modality fully connected layer may feed into a second hidden layer of the LSTM, which is fully connected across the multiple modalities. The activations of this last hidden layer may be fed into a softmax layer with as many nodes as classes in the classification task. The number of classes in the ISI example corresponds to seven, one per each action. The weights of the LSTM and the memory modules in the hidden layers may be learned based on a seven-class classification task from videos and motion data in the ISI dataset. An illustration of the temporal unfolding of the operation of the fusion module is included in FIG. 5.

This action classification module takes the temporally unified representation of both data modalities and makes a decision about the class to which the input data corresponds. In one embodiment, the classification module can be implemented as an output softmax layer with which the weights of the temporal fusion module are trained. In alternative embodiments, once the weights of the fusion module are optimized, the activation of the last hidden layer of the temporal fusion module may be used to train a classifier, for example one based on a support vector machine (SVM), a random forest or a decision tree.

Figure 6:
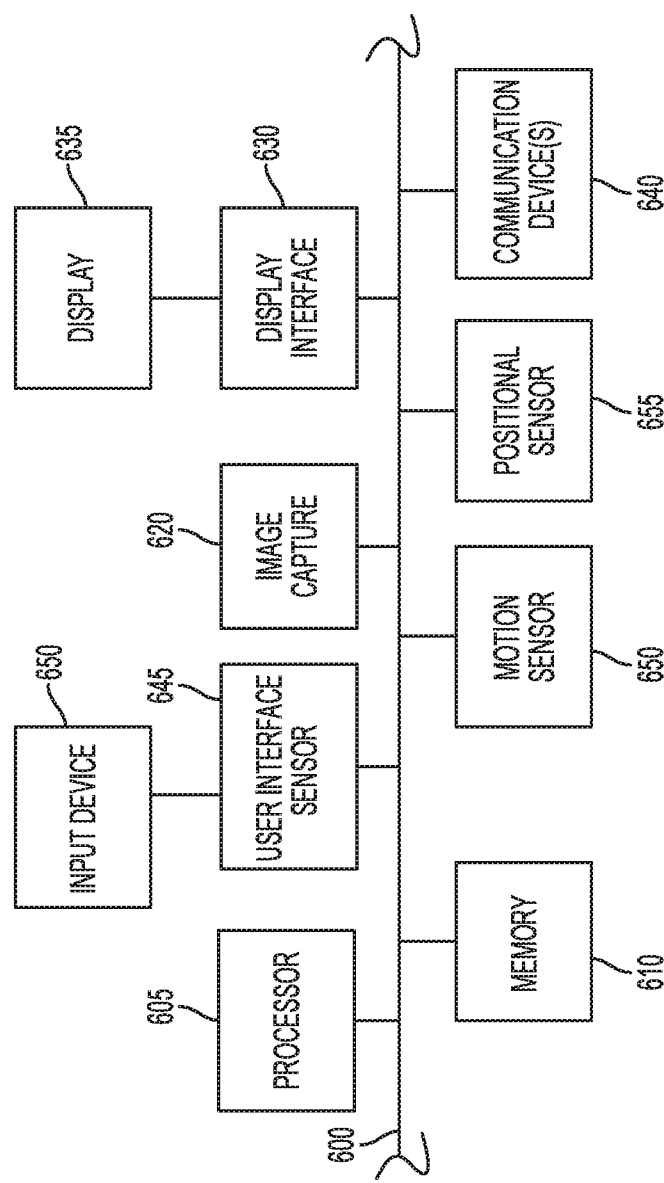
FIG. 6 depicts various embodiments of a computing device that may be used implementing certain processes described in this document.

FIG. 6 depicts an example of internal hardware that may be included in any of the electronic components of the system, an electronic device, or a remote server. An electrical bus 600 serves as an information highway interconnecting the other illustrated components of the hardware. Processor 605 is a central processing device of the system, i.e., a computer hardware processor configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 610. A memory device may include a single device or a collection of devices across which data and/or instructions are stored.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a transmitter and/or receiver, antenna, an RFID tag and/or short-range or near-field communication circuitry. A communication device 640 may be attached to a communications network, such as the Internet, a local area network or a cellular telephone data network.

The hardware may also include a user interface sensor 645 that allows for receipt of data from input devices 650 such as a keyboard, a mouse, a joystick, a touchscreen, a remote control, a pointing device, a video input device and/or an audio input device. Data also may be received from a video capturing device 620. A positional sensor 655 and motion sensor 550 may be included to detect position and movement of the device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A multimodal action classification system, comprising:
   a video camera;
   at least one sensor device that comprises one or more of the following: a microphone, a motion sensor, a positional sensor, or a temperature sensor;
   a processor;
   a data store of classes and actions; and
   a computer-readable memory device containing programming instructions that are configured to, when executed, cause the processor to:
      receive, from the video camera, a sequence of digital images, wherein each of the digital images is associated with a time stamp,
      receive, from the at least one sensor device, other sensed data, wherein each item of other sensed data is associated with a time stamp,
      extract a plurality of video features from the sequence of digital images so that each extracted image feature is associated with a time period,
      extract a plurality of other features from the other sensed data so that each extracted other feature is associated with the time period,
      use a multi-layer long-short-term memory network to fuse a group of the extracted video features having time stamps corresponding to the time period and a group of the extracted other features having time stamps corresponding to the time period to create a fused feature representation, wherein the multi-layer long-short-term memory network comprises:
         a first set of layers, wherein each layer in the first set is configured to independently operate on a single data modality, and wherein the first set of layers is configured to generate a set of per-modality features; and
         a second set of layers configured to receive the per-modality features from the first set of layers and generate the fused feature representation as a set of fused features across data modalities,
      analyze the fused feature representation to identify a class that applies to both the extracted video features and the extracted other features,
      access the data store of classes and actions to identify an action that is associated with the class, and
      save the identified action to a computer readable memory device.

2. The system of claim 1, wherein the instructions that are configured to cause the processor to extract the video features and extract other features comprise instructions to:
   use at least one deep network to learn a set of video features and other features to extract, wherein the deep network comprises one or more of the following: a neural network, a convolutional neural network, an autoencoder, a Boltzmann machine, a long-short-term memory network, a convolutional neural network cascaded with a long-short-term memory network, an end-to-end deep neural network or a belief network; and
   when extracting the video features and the other features, extract features corresponding to those of the learned set.

3. The system of claim 1, further comprising additional programming instructions that are configured to cause the processor to temporally aggregate the extracted video features and the extracted other features across a plurality of video clips prior to the fusing.

4. The system of claim 3, further comprising additional programming instructions that are configured to cause the processor to, after the temporal aggregation and prior to the fusing, model temporal characteristics of the extracted video features and modeling temporal characteristics of the extracted other features.

5. The system of claim 1, wherein the instructions to create the fused feature representation comprise instructions to build a joint temporal model that jointly models temporal characteristics of the extracted video features and temporal characteristics of the extracted other features.

6. The system of claim 1, wherein the video camera comprises a first transmitter that, in operation, will transmit the sequence of digital images to the processor.

7. The system of claim 1, wherein the at least one sensor device comprises:
- a wearable device having a motion sensor that is configured to capture the other sensed data as motion data, and
- a second transmitter that, in operation, will transmit the motion data to the processor.

8. The system of claim 1, further comprising additional instructions that are configured to cause the processor to:
- output the identified action via a user interface of an electronic device;
- access the data store to identify a subsequent action step that corresponds to the action, wherein the subsequent action step comprises a step in sequence of known actions; and
- output the subsequent action step via a user interface of a computing device.

9. The system of claim 1, wherein the instructions to fuse the extracted video features and the extracted other features to create the fused feature representation comprise instructions to use a long-short-term memory network having a first hidden layer and a second hidden layer so that:
- the first hidden layer independently identifies temporal trends in the extracted video features and the extracted motion features; and
- the second hidden layer uses the identified temporal trends to identify temporal correlations across modalities and performs the fusion.

10. A method of using a multimodal sensing system to automatically recognize an action, the method comprising:
- operating a video camera to capture a sequence of digital images;
- operating at least one sensor device to capture other sensed data; and
- by a processor, executing programming instructions that cause the processing device to:
  - receive, from the video camera, the sequence of digital images, wherein each of the digital images is associated with a time stamp,
  - receive, from the at least one sensor device, the other sensed data, wherein each item of other sensed data is associated with a time stamp,
  - extract a plurality of video features from the sequence of digital images so that each extracted image feature is associated with a time period,
  - extract a plurality of other features from the other sensed data so that each extracted other feature is associated with the time period,
  - use a multi-layer long-short-term memory network to fuse a group of the extracted video features having time stamps corresponding to the time period and a group of the extracted other features having time stamps corresponding to the time period to create a fused feature representation, wherein the multi-layer long-short-term memory network comprises:
    - a first set of layers, wherein each layer in the first set is configured to independently operate on a single data modality, and wherein the first set of layers is configured to generate a set of per-modality features; and
    - a second set of layers configured to receive the per-modality features from the first set of layers and generate the fused feature representation as a set of fused features across data modalities,
  - analyze the fused feature representation to identify a class that applies to both the extracted video features and the extracted other features,
  - access a data store of classes and actions to identify an action that is associated with the class, and
  - save the identified action to a computer readable memory device.

11. The method of claim 10, wherein the at least one other sensor device comprises one or more of the following: a microphone, a motion sensor, a positional sensor, or a temperature sensor.

12. The method of claim 10, further comprising:
- using at least one deep network to learn a set of video features and other features to extract, wherein the deep network comprises one or more of the following: a neural network, a convolutional neural network, an autoencoder, a Boltzmann machine, a long-short-term memory network, a convolutional neural network cascaded with a long-short-term memory network, an end-to-end deep neural network or a belief network; and
- when extracting the video features and the other features, extracting features corresponding to those of the learned set.

13. The method of claim 10, further comprising, by the processor, temporally aggregating the extracted video features and the extracted other features across a plurality of video clips prior to the fusing.

14. The method of claim 13, further comprising, by the processor after the temporal aggregation and prior to the fusing, modeling temporal characteristics of the extracted video features and modeling temporal characteristics of the extracted other features.

15. The method of claim 10, wherein create creating the fused feature representation comprises building a joint temporal model that jointly models temporal characteristics of the extracted video features and modeling temporal characteristics of the extracted other features.

16. The method of claim 10, further comprising:
- by the video camera, capturing the sequence of digital images; and
- using a first transmitter to transmit the sequence of digital images to the processor.

17. The method of claim 10, further comprising:
- by a wearable electronic device that includes the at least one sensor device, using a motion sensor to capture the other sensed data as motion data; and
- using a second transmitter to transmit the motion data to the processor.

18. The method of claim 10, further comprising, by the processor:
- outputting the identified action via a user interface of an electronic device;
- accessing the data store to identify a subsequent action step that corresponds to the action, wherein the subsequent action step comprises a step in sequence of known actions; and
- outputting the subsequent action step via a user interface of a computing device.

19. The method of claim 10, wherein fusing the extracted video features and the extracted other features to create the fused feature representation comprises using a long-short-term memory network having a first hidden layer and a second hidden layer so that:
- the first hidden layer independently identifies temporal trends in the extracted video features and the extracted motion features; and the second hidden layer uses the identified temporal trends to identify temporal correlations across modalities and performs the fusion.

20. A multimodal action classification system, comprising:
   a video camera;
   at least one sensor device that comprises one or more of the following: a microphone, a motion sensor, a positional sensor, or a temperature sensor;
   a processor;
   a data store of classes and actions; and
   a computer-readable memory device containing programming instructions that are configured to, when executed, cause the processor to:
      receive, from the video camera, a sequence of digital images, wherein each of the digital images is associated with a time stamp,
      receive, from the at least one sensor device, other sensed data, wherein each item of other sensed data is associated with a time stamp,
      extract a plurality of video features from the sequence of digital images so that each extracted image feature is associated with a time period,
      extract a plurality of other features from the other sensed data so that each extracted other feature is associated with the time period,
      use a long-short-term memory network having a first hidden layer and a second hidden layer to fuse a group of the extracted video features having time stamps corresponding to the time period and a group of the extracted other features having time stamps corresponding to the time period to create a fused feature representation so that:
         the first hidden layer independently identifies temporal trends in the extracted video features and the extracted motion features; and
         the second hidden layer uses the identified temporal trends to identify temporal correlations across modalities and performs the fusion,
      analyze the fused feature representation to identify a class that applies to both the extracted video features and the extracted other features,
      access the data store of classes and actions to identify an action that is associated with the class, and
      save the identified action to a computer readable memory device.

21. The system of claim 20, wherein the instructions that are configured to cause the processor to extract the video features and extract other features comprise instructions to:
   use at least one deep network to learn a set of video features and other features to extract, wherein the deep network comprises one or more of the following: a neural network, a convolutional neural network, an autoencoder, a Boltzmann machine, a long-short-term memory network, a convolutional neural network cascaded with a long-short-term memory network, an end-to-end deep neural network or a belief network; and
   when extracting the video features and the other features, extract features corresponding to those of the learned set.

22. The system of claim 20, further comprising additional programming instructions that are configured to cause the processor to temporally aggregate the extracted video features and the extracted other features across a plurality of video clips prior to the fusing.

23. The system of claim 22, further comprising additional programming instructions that are configured to cause the processor to, after the temporal aggregation and prior to the fusing, model temporal characteristics of the extracted video features and modeling temporal characteristics of the extracted other features.

24. The system of claim 20, wherein the instructions to create the fused feature representation comprise instructions to build a joint temporal model that jointly models temporal characteristics of the extracted video features and temporal characteristics of the extracted other features.

25. The system of claim 20, wherein the video camera comprises a first transmitter that, in operation, will transmit the sequence of digital images to the processor.

26. The system of claim 20, wherein the at least one sensor device comprises:
   a wearable device having a motion sensor that is configured to capture the other sensed data as motion data, and
   a second transmitter that, in operation, will transmit the motion data to the processor.

27. The system of claim 20, further comprising additional instructions that are configured to cause the processor to:
   output the identified action via a user interface of an electronic device;
   access the data store to identify a subsequent action step that corresponds to the action, wherein the subsequent action step comprises a step in sequence of known actions; and
   output the subsequent action step via a user interface of a computing device.

28. A method of using a multimodal sensing system to automatically recognize an action, the method comprising:
   operating a video camera to capture a sequence of digital images;
   operating at least one sensor device to capture other sensed data; and
   by a processor, executing programming instructions that cause the processing device to:
      receive, from the video camera, the sequence of digital images, wherein each of the digital images is associated with a time stamp,
      receive, from the at least one sensor device, the other sensed data, wherein each item of other sensed data is associated with a time stamp,
      extract a plurality of video features from the sequence of digital images so that each extracted image feature is associated with a time period,
      extract a plurality of other features from the other sensed data so that each extracted other feature is associated with the time period,
      using a long-short-term memory network having a first hidden layer and a second hidden layer to fuse a group of the extracted video features having time stamps corresponding to the time period and a group of the extracted other features having time stamps corresponding to the time period to create a fused feature representation so that:
         the first hidden layer independently identifies temporal trends in the extracted video features and the extracted motion features; and
         the second hidden layer uses the identified temporal trends to identify temporal correlations across modalities and performs the fusion,
      analyze the fused feature representation to identify a class that applies to both the extracted video features and the extracted other features, access a data store of classes and actions to identify an action that is associated with the class, and
save the identified action to a computer readable memory device.

29. The method of claim 28, further comprising:
using at least one deep network to learn a set of video features and other features to extract, wherein the deep network comprises one or more of the following: a neural network, a convolutional neural network, an autoencoder, a Boltzmann machine, a long-short-term memory network, a convolutional neural network cascaded with a long-short-term memory network, an end-to-end deep neural network or a belief network; and
when extracting the video features and the other features, extracting features corresponding to those of the learned set.

30. The method of claim 28, further comprising, by the processor, temporally aggregating the extracted video features and the extracted other features across a plurality of video clips prior to the fusing.

31. The method of claim 30, further comprising, by the processor after the temporal aggregation and prior to the fusing, modeling temporal characteristics of the extracted video features and modeling temporal characteristics of the extracted other features.

32. The method of claim 28, wherein create creating the fused feature representation comprises building a joint temporal model that jointly models temporal characteristics of the extracted video features and modeling temporal characteristics of the extracted other features.

33. The method of claim 28, further comprising:
by the video camera, capturing the sequence of digital images; and
using a first transmitter to transmit the sequence of digital images to the processor.

34. The method of claim 28, further comprising:
by a wearable electronic device that includes the at least one sensor device, using a motion sensor to capture the other sensed data as motion data; and
using a second transmitter to transmit the motion data to the processor.

35. The method of claim 28, further comprising, by the processor:
outputting the identified action via a user interface of an electronic device;
accessing the data store to identify a subsequent action step that corresponds to the action, wherein the subsequent action step comprises a step in sequence of known actions; and
outputting the subsequent action step via a user interface of a computing device.

* * * * *